United States Patent Office
3,383,683
Patented May 14, 1968

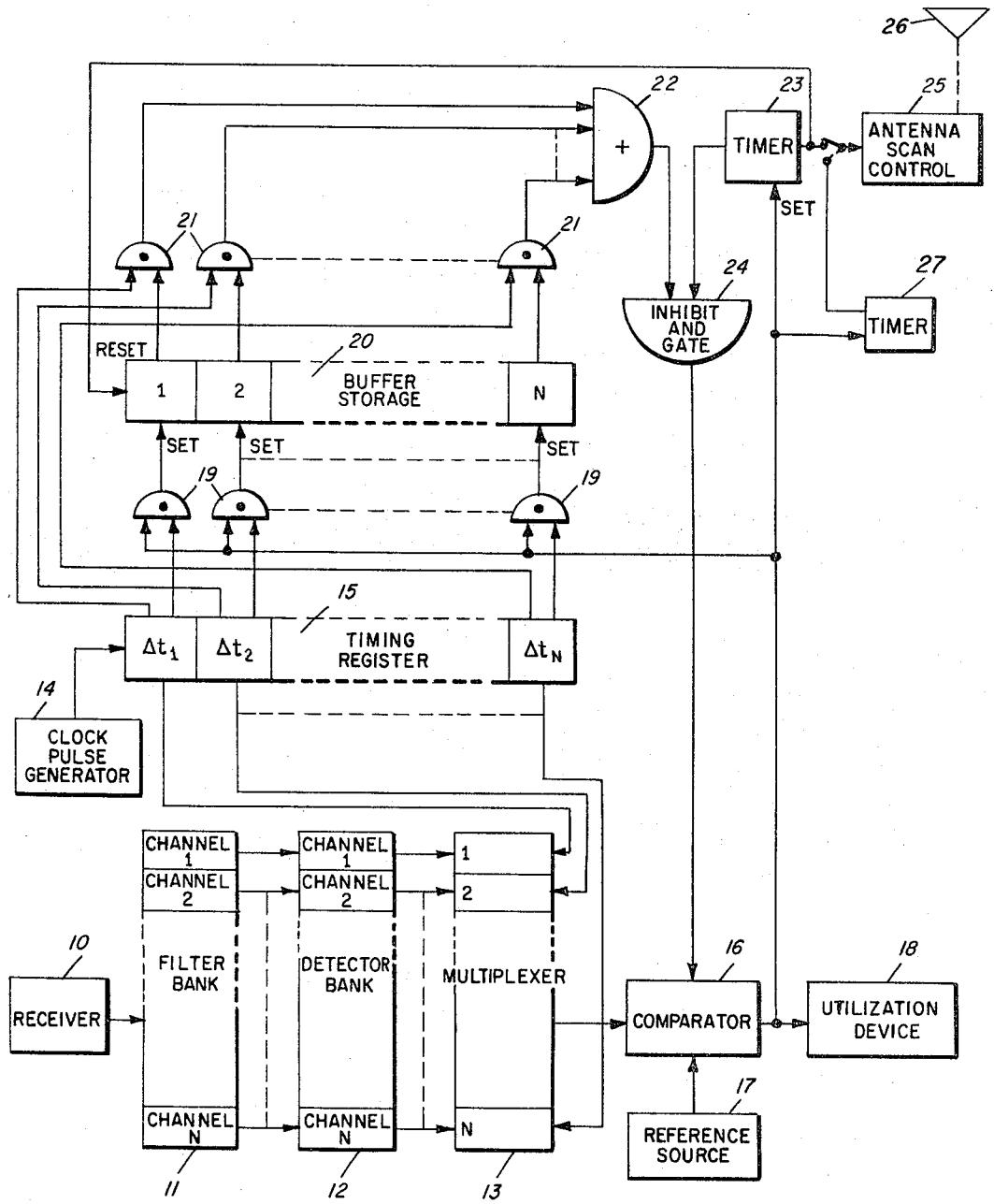

3,383,683
PULSE DOPPLER RADAR SYSTEM FOR SELECTIVELY INHIBITING TARGET DETECTION
Keith A. Harriger, Glen Burnie, and John G. Hurt, Jr., Baltimore, Md., assignors, by mesne assignments, to the United States of America as represented by the Secretary of the Navy
Filed Dec. 19, 1966, Ser. No. 603,407
11 Claims. (Cl. 343—7.7)

ABSTRACT OF THE DISCLOSURE

The invention is directed to a Doppler radar system which unambiguously detects a plurality of targets at a given azimuth. A target signal received at a given azimuth is stored in a memory device. If a second signal is received from the same target, the memory is activated and the output of the system is inhibited to prevent the passage of this signal to the utilization network. If a signal is received from a second target at the same azimuth as the first, the memory will not be activated and the signal will pass to the utilization network.

---

The present invention relates to a pulse Doppler radar target detector and, more particularly, to a device for inhibiting the detection of a target once it has already been detected by a radar unit operating at a given azimuth in order to unambiguously detect any possible other targets at the same azimuth.

Pulse Doppler radar systems are well-known for their ability to unambiguously determine target velocity and to discriminate between targets moving at different velocities. Such systems generally have an antenna which scans the horizon until it detects a target. Once a target is detected, all information relating to that target is processed by he radar unit. The target may be monitored on the screen of a cathode ray tube, the beam of which is synchronized to display a spot representing a target located at a given azimuth moving at a given velocity.

Such systems have inherent shortcomings, especially in the case of multiple targets at given velocities at a given azimuth. When the antenna detects a target at a given azimuth, it stops its sweep and locks onto the target. If there are multiple targets located at that azimuth, the screen of the cathode ray tube constantly displays a clutter of dots representing the multiple targets. This clutter of dots causes confusion to an observer of the screen. Furthermore, the locking-on of the antenna to a target at a given azimuth precludes the system from detecting other targets at other azimuths.

Prior art devices have attempted to prevent lock-on of the antenna to one target by several methods. One method is to mechanically jolt the antenna after detection. A second method is to inhibit the complete system for an appropriate length of time after detection of a target and thereafter to begin the antenna scan again. The first method has proved impractical because the large momentum of the antenna imposes mechanical constraints. The second method is impractical in the case of the detection of a target at the same range and azimuth at which another target has just previously been detected. In such a situation, the inhibition of the complete system would prevent the detection of the second target.

The general purpose of this invention is to provide a system which prevents antenna lock-on and unambiguously detects a plurality of targets located at a given azimuth, and possesses none of the aforedescribed disadvantages. To attain this, the present invention contemplates an inhibiting circuit which inhibits the element of the system which detects a target located at a given azimuth and moving at a given veloctiy and located at a given range. The element is continuously inhibited until all the targets located at the same azimuth have been detected. In this manner, each target located at a given azimuth is monitored only once on the screen of the associated cathode ray tube during each scan. After all the units which have detected a target located at that azimuth are inhibited, the antenna scan is resumed thereby permitting the antenna to scan for other targets at other azimuths. Once scanning is resumed, all of the units in the system are uninhibited and remain so until a different target at a different azimuth is detected at which time the above-described procedure is repeated.

Accordingly, it is an object of the present invention to provide means to detect a target located at a given azimuth suitable for use in a radar system.

Another object of the present invention is to provide means for unambiguously monitoring a plurality of target representations for display which are in close proximity to one another on the screen of a cathode ray tube.

A further object of the present invention is to provide means for preventing a radar antenna from continuously locking-on to a detected target located at a given azimuth once detection of the target has been completed.

Still another object of the present invention is to provide means for inhibiting an element of a pulse Doppler target detecting system once it has detected a target located at a given azimuth.

Other objects, advantages and novel features of the present invention will become apparent from the following detailed description of the invention when considered in conjunction with the accompanying drawings wherein:

The figure discloses an embodiment of the present invention.

Referring now to the figure, signals reflected from a target are received and amplified by a receiver 10. The frequencies of the received signals are shifted with respect to the transmitted signal according to the Doppler principal by a frequency which bears some relationship to the velocity of the target with respect to the receiver. The received signals are translated to a filter bank 11. Filter bank 11 contains a plurality of bandpass filters, each being tuned to a different but neighboring frequency within the spectrum of the anticipated Doppler echo signal frequencies. The filter bank quantizes the incoming frequency spectrum such that the signal is passed through a number of channels in the filter bank, each containing a different filter. The velocity of the target with respect to the receiver may be ascertained by determining which channel of filter bank 11 passes the received signal. Each channel of filter bank 11 is coupled to an associated channel in a detector bank 12. Each channel in the detector bank contains an integrator which detects whether the output voltage is above a predetermined voltage level and integrates the received signal. If the output of the individual integrator exceeds the predetermined level, a target velocity signal is determined to be present. Any signal below the level is disregarded as merely noise in the circuit. The output of each channel of detector bank 12 is coupled to an associated channel in a multiplexer 13. Each channel of multiplexer 13 contains a gate circuit. The gate of each channel of the multiplexer is sampled sequentially by a timing register 15 which is shifted by a clock pulse generator 14. The output of the channel of detector bank 12 which detects a signal representing a target traveling at a given velocity persists for a sufficiently long time to be passed through its associated channel of multiplexer 13 during the cycle of timing register 15. The output of multiplexer 13 is coupled to a comparator 16. The comparator compares its received signal with a reference signal generated by reference source 17 in order to detect once more whether the received signal is a target signal or noise in the circuit.

If the signal received by the comparator is determined to be a target signal, it is then passed to a utilization device 18. Typically, the utilization device is a cathode ray tube having a display of range versus azimuth. If the utilization device is a cathode ray tube, its sweep is synchronized by means, not shown, to display a spot representing the detection of a target at a given velocity at a location on the display corresponding to the azimuth of the detected target. When a target is detected at a specified azimuth, a spot is painted on the display of the cathode ray tube. Another possible utilization device is a computer which keeps a file of receipt of all target signals at a given azimuth.

The output of comparator 16 is fed to each input of a plurality of logical AND gates 19, each associated with a successive stage of timing register 15. Each of the gates 19 receive another input from its associated stage of timing register 15. Each of the outputs of gates 19 are coupled to an associated stage of a buffer storage register 20 which is normally in a binary zero state. As timing register 15 successively samples the gates of multiplexer 13, it activates the input of the gate 19 corresponding to the channel of multiplexer 13 which is being sampled. If a target signal is present in the channel of the multiplexer being sampled, it is passed through comparator 16 to gates 19. The gate 19 corresponding to the multiplexer channel through which the detected signal passed generates a signal which sets its associated stage of buffer storage register 20 to its binary one stage. The output of each successive stage of timing register 15 is coupled to an input of an associated logical AND gate 21. Each output stage of buffer storage register 20 is also coupled as an input to the logical AND gate 21 associated with its corresponding stage of timing register 15. Thus, a signal is stored in one of the stages of buffer storage register 20, representing the detection of a target at a given velocity.

During any subsequent cycles of timing register 15, the gate 21 associated with a stage in which the signal is stored is activated to generate a signal which is passed through a logical OR gate 22 to one input of an inhibit AND gate 24. Inhibit AND gate 24 inhibits the operation of comparator 16 when both of its inputs are activated. The output of comparator 16 is also fed to the input of a timer 23. Timer 23 may be a one-shot multivibrator or any device which is set to begin a timing cycle, the duration of which is equal to the cycle of timing register 15, every time the timer receives a set signal from comparator 16.

If a signal representing a target at a given velocity is stored in one stage of buffer storage register 20, during the following cycle of timing register 15 the AND gate 21 corresponding to the stage of buffer storage register 20 containing a target signal is activated by the corresponding stage of timing register 15 for a period of time equal to the time duration of that stage of timing register 15. The activated AND gate 21 passes a signal through logical OR gate 22 to thereby activate one input of inhibit AND gate 24 for a period of time equal to the time duration of the stage of timing register 15. Since timer 23 was set to begin its cycle when the signal stored in buffer storage 20 was passed through comparator 16, the timer activates the other input of inhibit AND gate 24 for a full timing cycle. Since timing register 15 activates the logical AND gate 21 at the same time that it samples the corresponding channel of multiplexer 13, both inputs of inhibit AND gate 24 are activated to inhibit the operation of comparator 16 for a period of time during which timing register 15 samples the channel of multiplexer 13 through which a signal representing a target at a given velocity was passed in the preceeding cycle of the timing register.

Thus, a signal representing the detection of the same target at the same azimuth is fed only once to utilization device 18. If the utilization device is a cathode ray tube, an operator of the device observes only one dot on the screen representing a given target at a given velocity at a specified azimuth rather than a clutter of dots which may represent either the repetition of the same target or other targets at the same azimuh. Similarly, if the utilization device is a computer, the passage of a target signal only once for a given azimuth avoids the needless repetition of processing data relating to the same target signal for that azimuth. If a second signal is detected at the same azimuth representing a target of a different velocity, it is passed through its associated channel of filter bank 11, detector bank 12 and multiplexer 13 and through comparator 16. The signal resets the cycle of timer 23 to begin again and sets its associated stage of buffer storage 20 to its binary one state. Since the cycle of timer 23 is started a second time before the termination of the first cycle of timer 23, the stage of buffer storage 20 which recorded the receipt of the target signal retains its recordation and therefore the gates 21 corresponding to the stages of buffer storage 20 in which the detection of target signals are recorded activate inhibit gate 24 during the subsequent sampling of the respective channels of the multiplexer through which the signals initially passed.

Timer 23 has a reset terminal which is connected to an antenna scan control 25 to unlock an antenna 26 and cause it to continue to scan once the timer has completed a full cycle. The reset terminal also resets all of the stages of buffer storage 20 to their binary zero state. When timer 23 resets antenna scan control 25, antenna 26 begins its scan until it detects other targets at which time the above-described procedure is repeated. The above-described procedure is repeated upon receipt of any signals representing the detection of a target of a different velocity at a different azimuth. Each time another signal is received, the cycle of timer 23 is started again. Thus, the input of inhibit AND gate 24 associated with timer 23 remains activated until all of the signals representing the detection of targets at different velocities at a given azimuth are received and processed.

The present invention may be modified to be used in a pulsed radar system wherein range is quantized in the same manner that velocity is quantized in the above-described system. In the pulsed radar system with range so quantized, a target at a particular range is inhibited allowing other targets of different range at the same azimuth to be detected.

The invention may also be modified by the addition of a timer 27 connected as shown by the dotted line in the figure to antenna scan control 25. Timer 27 is started at the same point of time at which timer 23 is started. However, the duration of the cycle of timer 27 is slightly shorter than that of timer 23. This enables the antenna to begin scanning again slightly before the signal processing circuits become uninhibited. Thus, the antenna is moved to a different azimuth before detection begins again and repeated detection of the same target at the same azimuth does not occur.

Obviously many modifications and variations of the present invention are possible in the light of the above teachings. It is therefore to be understood that within the scope of the appended claims the invention may be practiced otherwise than as specifically described.

What is claimed is:

1. A radar detector for detecting targets located at a given azimuth comprising:
    a receiver for detecting echo signals;
    a filter bank connected to said receiver and having N channels of filters with each channel containing a bandpass filter tuned to a different but neighboring frequency within the spectrum of anticipated echo signal frequencies;
    programming means coupled to sequentially sample said channels;
    a reference source;

a comparator having a first input circuit coupled to said reference source, a second input circuit coupled to said programming means and an output circuit; and means connected between said programming means and said comparator for inhibiting the operation of said comparator for the portion of a sampling cycle during which a channel through which a signal has previously passed is sampled.

2. The system of claim 1 wherein said receiver is provided with a scanning antenna and wherein said system further includes:

a scan control system coupled to said antenna; and
circuit means coupling said scan control system to the output circuit of said comparator.

3. The system of claim 1 wherein said programming means contains:

a multiplexer having N channels respectively coupled to corresponding channels of said filter bank; and
means to sequentially couple said multiplexer channels to the second input circuit of said comparator.

4. The system of claim 3 wherein said receiver is provided with a scanning antenna and wherein said system further includes:

a scan control system coupled to said antenna; and
circuit means coupling said scan control system to the output circuit of said comparator.

5. The system of claim 3 wherein each of said multiplexer channels includes an output gate coupled to said comparator and wherein said means to sequentially couple said multiplexer channels to said comparator comprises:

said gates; and
a timing register having N stages respectively coupled to sequentially activate said gates.

6. The system of claim 5 wherein said receiver is provided with a scannnig antenna and wherein said system further includes:

a scan control system coupled to said antenna; and
circuit means coupling said scan control system to the output circuit of said comparator.

7. The system as described in claim 5 wherein said means for inhibiting the operation of said comparator contains:

a first set of N AND gates, each having one input coupled to a corresponding stage of said timing register and another input coupled to the output circuit of said comparator;
buffer storage means having N stages, each coupled to the output of one of said first set of N AND gates;
a second set of N AND gates, each having one input coupled to a corresponding stage of said buffer storage means and another input coupled to a corresponding stage of said timing register;
circuit means coupling the outputs of said second set of AND gates in common to the inhibit circuit of said comparator; and
a reset circuit for said buffer storage means.

8. The system of claim 7 wherein said receiver is provided with a scanning antenna and wherein said system further includes:

a scan control system coupled to said antenna; and
circuit means coupling said scan control system to the output circuit of said comparator.

9. The system of claim 7 wherein said circuit means coupling said second set of AND gates to said comparator includes:

an inhibit AND gate having one input coupled in common to the outputs of said second set of AND gates and having the output thereof connected to the inhibit circuit of said comparator and wherein there is further provided:

a timer having an activating circuit and an output circuit;
means for connecting the activating circuit of said timer to the output circuit of said comparator; and
means for connecting the output circuit of said timer to another input of said inhibit AND gate and to the reset circuit of said buffer storage means.

10. The system of claim 9 wherein said receiver is provided with a scanning antenna and wherein said system further includes:

an antenna scan control system coupled to the output of said timer.

11. The system of claim 10 wherein there is provided:

a detector bank containing N channels respectively coupled between corresponding filter bank channels and multiplexer channels.

References Cited

UNITED STATES PATENTS

| | | | |
|---|---|---|---|
| 2,410,424 | 11/1946 | Brown | 343—112.4 |
| 3,196,434 | 7/1965 | Cutler | 343—7.7 |
| 3,277,473 | 10/1966 | Calhoon et al. | 343—17.1 |

RODNEY D. BENNETT, *Primary Examiner.*

J. G. BAXTER, *Assistant Examiner.*